US009055562B2

(12) United States Patent
Sanders, III et al.

(10) Patent No.: US 9,055,562 B2
(45) Date of Patent: Jun. 9, 2015

(54) REAL TIME TRAFFIC ADAPTIVE DATA CHANNEL BANDWIDTH CONTROL AMONG AGENCY ACCESS GROUPS

(71) Applicant: MOTOROLA SOLUTIONS, INC., Schaumburg, IL (US)

(72) Inventors: Stephen H. Sanders, III, Glenview, IL (US); Yunhai Yang, Elgin, IL (US); Leslie G. Gustafson, Oakwood Hills, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 186 days.

(21) Appl. No.: 13/631,320

(22) Filed: Sep. 28, 2012

(65) Prior Publication Data

US 2014/0092817 A1    Apr. 3, 2014

(51) Int. Cl.
*H04W 74/04* (2009.01)
*H04W 84/08* (2009.01)

(52) U.S. Cl.
CPC .............. *H04W 74/04* (2013.01); *H04W 84/08* (2013.01)

(58) Field of Classification Search
USPC ......... 370/329, 336, 328, 230, 252, 280, 254, 370/442; 709/226, 206; 705/14.45, 14.55; 455/509
See application file for complete search history.

(56) References Cited

U.S. PATENT DOCUMENTS

| | | | |
|---|---|---|---|
| 3,683,116 A | 8/1972 | Dill | |
| 4,831,373 A | 5/1989 | Hess | |
| 4,837,858 A | 6/1989 | Ablay et al. | |
| 4,870,408 A | 9/1989 | Zdunek et al. | |
| 5,841,777 A * | 11/1998 | Cohen | 370/443 |
| 6,031,832 A | 2/2000 | Turina | |
| 7,079,509 B2 | 7/2006 | Belcea | |
| 7,133,396 B1 * | 11/2006 | Schmidl et al. | 370/347 |
| 7,233,584 B2 * | 6/2007 | Nguyen et al. | 370/337 |
| 7,489,636 B1 | 2/2009 | Cheung | |
| 2002/0197996 A1 | 12/2002 | Popovich | |
| 2004/0028018 A1 | 2/2004 | Cain | |
| 2006/0077930 A1 * | 4/2006 | Kim et al. | 370/329 |
| 2007/0081490 A1 | 4/2007 | Kim et al. | |

(Continued)

OTHER PUBLICATIONS

Mason, A., "Bandwidth Management," CCSP Self-Study: Cisco Secure Virtual Private Networks (CSVPN), 2nd Edition, May 2004, pp. 5.

(Continued)

*Primary Examiner* — Benjamin H Elliott, IV
*Assistant Examiner* — Eric Nowlin
(74) *Attorney, Agent, or Firm* — Daniel R. Bestor

(57) ABSTRACT

A scheduling component associated with a data channel configures initial reserved bandwidth allocations for each agency permitted access to a shared data channel. When sufficient bandwidth is available on the shared data channel to meet all bandwidth requests, the scheduling component schedules access to available random access slots on the shared data channel. When an agency accesses a scheduled random access slot, the agency is able to reserve additional reserved slots on the shared data channel for data transmission on an on-demand basis. The scheduling component enables bandwidth management controls when one or more requests for the additional reserved slots on the shared data channel cannot be fulfilled due to insufficient available additional reserved slots on the shared data channel and controls access to the shared data channel by distributing limited access permissions for future available random access slots to agencies permitted access to the shared data channel.

17 Claims, 3 Drawing Sheets

(56) References Cited

U.S. PATENT DOCUMENTS

2007/0248072 A1  10/2007  Kwon et al.
2009/0161617 A1   6/2009  Abedi
2010/0157958 A1*  6/2010  Wong et al. .................. 370/337
2011/0228733 A1   9/2011  Koo et al.

OTHER PUBLICATIONS

PCT International Communication Dated Feb. 26, 2014 for Counterpart Application PCT/US2013/060456.

* cited by examiner

REAL TIME TRAFFIC ADAPTIVE DATA CHANNEL BANDWIDTH CONTROL AMONG AGENCY ACCESS GROUPS

FIELD OF THE DISCLOSURE

The present disclosure relates to sharing a data channel between multiple agencies and to controlling each agency's access to the data channel bandwidth.

BACKGROUND

Narrowband networks include a number of infrastructure components for facilitating communications between communication devices. An example of such a narrowband network is a network used by a Project 25 (P25)-compatible two-way Push-To-Talk voice communication system that includes wireless and wired voice and data communication devices. The voice and data communication devices may be, for example, portable narrowband two-way radios, mobile radios, dispatch consoles, or other similar voice and/or data communication entities that communicate with one another via wired and/or wireless networks. A narrowband system may be shared by multiple groups of users (each group of users is referred to herein as an agency, which may be associated with, for example, a fire department, police department, retail store, etc.). Each agency typically uses a fraction of the radio frequency (RF) resources (for example, data channels) available on the system to meet the agency's communication needs.

When data channels are assigned to one or more agencies, the data channel's bandwidth could be partitioned among the agencies, using well-known techniques. In some implementations, when one or more data channels are shared by multiple agencies, each agency is assigned a percentage of the data channel's bandwidth. If a fixed percentage of the available data channel's bandwidth is assigned to a specific agency, when the agency is not using all of its assigned bandwidth at any given time, this bandwidth goes to waste and is not utilized. When data channels are shared by multiple agencies, some means is necessary to guarantee minimum data bandwidth to agencies when the total data bandwidth is fully utilized. In addition, there needs to be an avenue for allowing those agencies that are not guaranteed data bandwidth use of unused portions of the guaranteed bandwidth during slow periods.

Accordingly, there is a need for an improved method and apparatus for sharing a data channel bandwidth between multiple agencies and controlling each agency's access to the data channel bandwidth.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
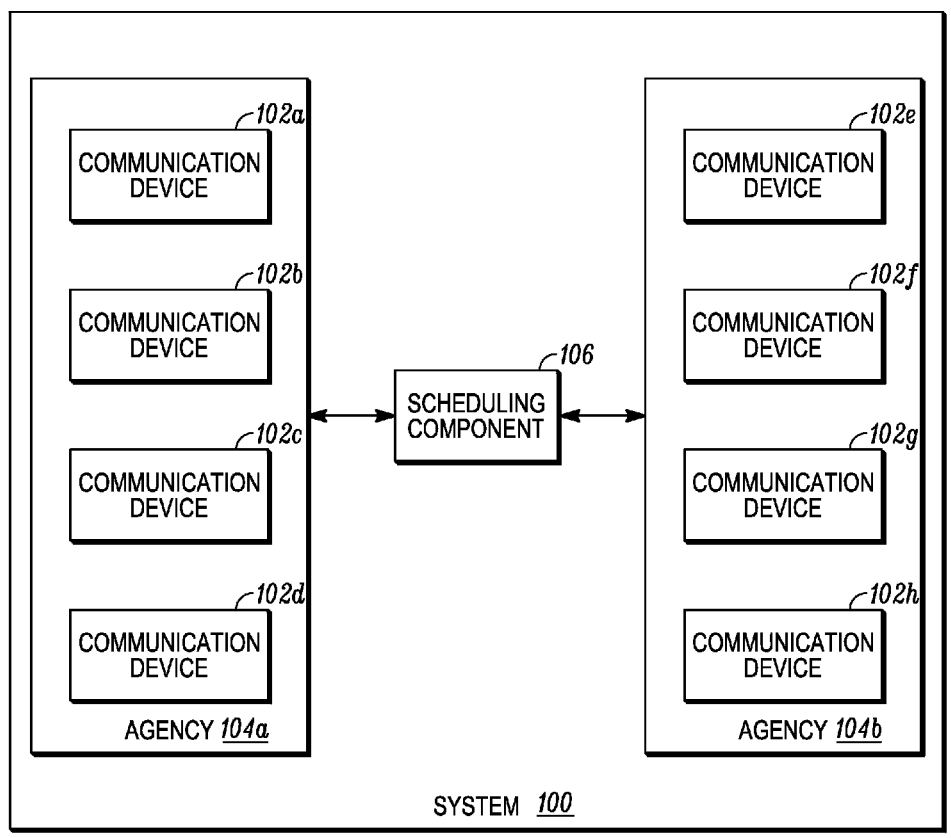
FIG. 1 is a block diagram of a narrowband system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for granting agency access to a shared data channel. A scheduling component associated with the data channel configures initial reserved bandwidth allocations for each agency permitted access to a shared data channel. When sufficient bandwidth is available on the shared data channel to meet all bandwidth requests, the scheduling component schedules access to available random access slots on the shared data channel. When an agency accesses a scheduled random access slot, the agency is able to reserve additional reserved slots on the shared data channel for data transmission on an on-demand basis. The scheduling component enables bandwidth management controls when one or more requests for the additional reserved slots on the shared data channel cannot be fulfilled due to insufficient available additional reserved slots on the shared data channel. The scheduling components controls access to the shared data channel by distributing limited access permissions for future available random access slots to agencies permitted access to the shared data channel. Access permissions are distributed according to the initial reserved bandwidth allocations and a determined usage on the shared data channel over a predetermined prior period of time.

FIG. 1 is a block diagram of a narrowband system used in accordance with some embodiments. An example of such a narrowband system is a Project 25 (P25)-compatible two-way Push-To-Talk voice communication system that includes wireless and wired voice and data communication devices. Of course, other narrowband systems, such as Digital Mobile Radio (DMR) or Terrestrial Trunked Radio (TETRA), etc. could be used as well. System 100 may include portable/mobile communication devices 102 that are configured to communicate on a data channel. Portable/mobile communication devices 102 may be radios, for example, portable two-way radios, mobile radios, or other similar portable or mobile communication devices. Portable/mobile communication devices 102 are also referred to as stations 102 in this discussion.

One or more stations 102 may be used by an organization or agency, for example agency 104*a* or 104*b*, wherein a data channel on system 100 may be shared by two or more agencies. System 100 may implement multiple access techniques, such as Orthogonal Frequency-Division Multiple Access (OFDMA), time division multiple access (TDMA), Frequency Division Multiple Access (FDMA), or Carrier Sense Multiple Access (CSMA) that allow different agencies to share an available bandwidth by allotting to each agency a fraction of the system resources. System 100 also includes a scheduling component 106 for scheduling portions of the data channel to specific agencies. It should be noted that scheduling component 106 may control access to all data channels or may be associated with individual data channels to control access to slots on each individual data channel. Other components of system 100 are not shown for ease of illustration.

Figure 2:
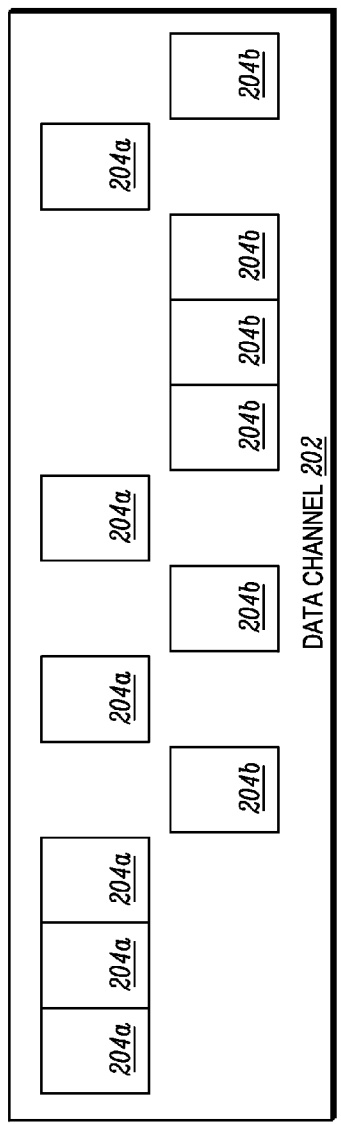
FIG. 2 is a block diagram of an example of data channel shared by two or more agencies in accordance with some embodiments.

FIG. 2 is a block diagram of an example data channel shared by two or more agencies in accordance with some embodiments. The data channel 202 is divided into slots 204, where slots 204a are allocated to a first agency and slots 204b are allocated to a second agency. Slots 204a and 204b can be allocated in any combination of consecutive or interleaved resource blocks. In the slotted data channel architecture, each agency may use a random access slot (also referred to herein as an RA-Slot) on an inbound channel for an inbound random access request. Each agency may also use a reserved slot (also referred to herein as an RS-Slot) on the inbound channel for inbound data transmission. The RA-Slot may be, for example, a 15 ms random access slot and the RS-Slot may be, for example, a 30 ms reserved slot. In some embodiments, each station sends in a random access data request (also referred to herein as an RA-Request) on an available RA-Slot. Access to an available RA-Slot is referred to as an RA-Slot-opportunity and is defined during random access scheduling (RA-Scheduling) at, for example, a 360 ms periodical boundary.

The RA-Request includes information about the number of RS-Slots a requesting agency needs to transmit an entire data packet. Responsive to receiving an RA-Request, the scheduling component on the channel sends with an acknowledgment (RA-ACK) to indicate to the requesting agency that the RA-Request was successfully received. After receiving the RA-ACK, the requesting agency waits for the RS-Scheduling (at, for example, a 360 ms periodical boundary) and transmits the data packet in a scheduled RS-Slot(s). After receiving the data from the scheduled RS-Slot(s), the scheduling component on the channel evaluates if each RS-Slot transmission was successful or if it failed. If an RS-Slot transmission is determined to be unsuccessful, the scheduling component sends a selective acknowledgment and an additional RS-Slot to the agency for the agency to resend data associated with the failed RS-Slot transmission.

In some embodiments, as long as bandwidth is available, stations associated with agencies can use any available RA-Slot to send data requests. As load on available data channel(s) increases, more data channels may be requested to service the load. When bandwidth on the available data channel(s) becomes constrained (i.e., all channel requests can no longer be fulfilled because there are insufficient resources), and/or the current load exceeds a pre-determined level, the scheduling component turns bandwidth management controls on and RA-Slots are designated to be used by specific agencies in accordance with initially configured agency bandwidth allocations. The utilization of RA-Slot-opportunities for each agency is periodically checked. If an agency is not utilizing its designated RA-Slot-opportunities, those opportunities are gradually made available to other agencies or stations. If an agency needs more RA-Slot-opportunities than are currently allocated to that agency, more RA-Slot-opportunities are designated for the agency, up to its initially configured bandwidth allocation. An agency's utilization of its bandwidth (which may include scheduled RA-Slots and RS-Slots) is also checked. If the agency's utilization of its bandwidth exceeds its pre-configured bandwidth allocation (even though it is within its allocation for RA-Slots), the scheduling component may deny some requests (for example, by sending a negative acknowledgement in response to the agency's RA-Requests) to bring the agency's bandwidth usage back within its bandwidth allocation.

Figure 3:
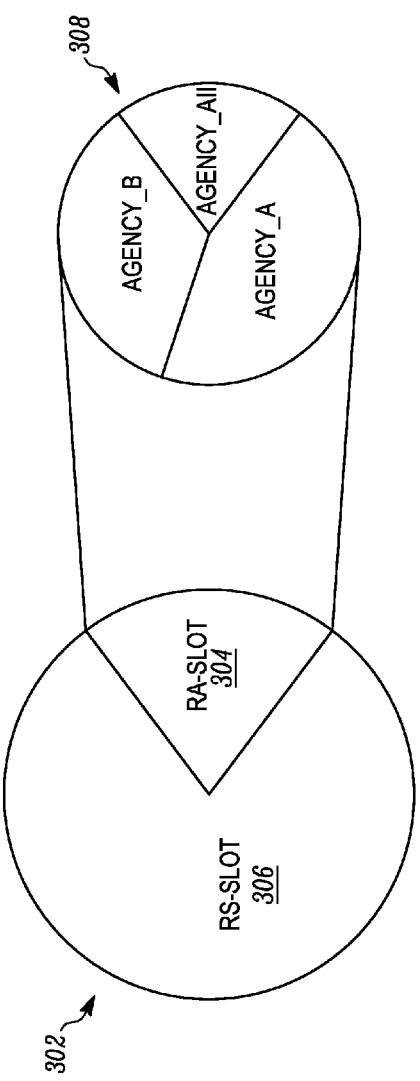
FIG. 3 is a diagram of how agency access to a data channel is controlled in accordance with some embodiments.

FIG. 3 is a diagram of how agency access to a data channel may be controlled in accordance with some embodiments. The scheduling component controls distribution between RS-Slot usage and RA-Slot-opportunity to protect allocated agency bandwidth and reliability. A data channel 302 is divided into an RA-Slot portion 304 for receiving inbound RA-Requests and an RS-Slot portion 306 for receiving data packets. It should be noted that the portions of data channel 302 assigned to RA-Slots and RS-Slots may vary. It should also be noted that the portions of data channel 302 assigned to RA-Slots and RS-Slots may or may not be contiguous. Agency A, B, and ALL (representing, for example, Agencies A, B, C-X), shown in FIG. 3 as component 308, access RS-Slots 306 on data channel 302 by accessing RA-Slot-opportunities. Accordingly, the scheduling component controls available RA-Slot-opportunity distributions (i.e., access to available RA-Slots) among Agency A, B, and ALL based on the traffic load, and thereby protects agency bandwidth and reliability, and optimizes channel efficiency.

In some embodiments, each agency's access to RS-Slots 306 is managed by controlling access to RA-Slots 304 (RA-Slot-opportunity) as signaled in the RA-Scheduling information. The scheduling component on a channel sets permission for each scheduled RA-Slot-opportunity, such that a specific agency(s) or all agencies are allowed to use the scheduled RA-Slot-opportunity. The scheduling component on the channel dynamically "releases" and "retrieves" protected agency-specific RA-Slot-opportunities so that other agencies (protected or not) can use them based on the traffic needs. The scheduling component on the channel periodically re-distributes all the available RA-Slot-opportunities among agencies in accordance with their needs and protected bandwidth configuration(s). In addition, the scheduling component manages how each agency accesses slots on the data channel by controlling the quantity of available RA-Slot-opportunities as compared to RS-Slot under overloaded condition. For example, the scheduling component on the channel sends a negative acknowledgment to successful RA-Requests for agency(s) that exceed their protected bandwidth configuration. A station that receives a negative acknowledgment operates in the same manner as a station that failed in RA-Request attempts. In some embodiments, the scheduling component for each data channel operates identically and independently.

In an embodiment, the scheduling component calculates packet information for each agency in order to initially configure resources that are to be assigned to each agency. For example, the scheduling component may use information associated with each agency (e.g., the user capacity, time and packet size) to calculate the packets per second, slots per packet, estimated bandwidth needed, and whether or not the agency is protected. Based on the calculated information, the scheduling component may determine the minimum and/or maximum channels needed to services agencies and pre-configure the percentages of slots and the percentages of bandwidth on each channel that are to be allocated to specific agencies. For example, using the agencies shown in FIG. 3 and based on a particular set of calculated information, the scheduling component may determine that 48% of the available slots are to be allocated to Agency A, 52% of the available slots are to be allocated to agency B and nothing is to be allocated to Agency C; and that 36% of the available bandwidth are to be allocated to Agency A, 64% of the available bandwidth are to be allocated to agency B and nothing is to be allocated to Agency C.

When channel resources are available, if a new data channel is needed, the scheduling component associated with each active channel allows all RA-Slot-opportunities from all agencies, including Agency C that has no resources allocated to it. If, however, there is a request for a new data channel but there are insufficient resources available to fulfill the request, the scheduling component enables access control. At each channel, the scheduling component randomly assigns, based on an access probability associated with each agency, an access permission for every outstanding RA-Slot-opportunity. An initial access probability associated with each agency is obtained from the percentage of slots allocated to the agency. For example, using the agencies shown in FIG. 3 and the percentages of the available slots allocated to Agency A, Agency B, and Agency C, the access probability associated with Agency A is 48%, and the access probability associated with Agency B is 52%. Accordingly, when access control is enabled, at each channel, the scheduling component randomly assigns an access permission for each outstanding RA-Slot opportunity based on the 48% access probability associated with Agency A and the 52% access probability associated with Agency B. The initial access probability may also be the protection upper bound for each agency.

After the scheduling component enables access control, the scheduling component keeps access control on until the currently unavailable data channel(s) become available and the scheduling component can allocate a new data channel using a free/available resource. As noted above, if an agency's utilization of its bandwidth exceeds its pre-configured bandwidth allocation (even though it is within its allocation for RA-Slots), the scheduling component may deny some requests (for example, by sending a negative acknowledgement in response to the agency's RA-Requests) to bring the agency's bandwidth usage back within its bandwidth allocation. Therefore, currently unavailable data channel(s) may become available, for example, when pending RA-Requests are denied and/or when currently unavailable RS-Slots are no longer needed for outstanding RA-Requests. When resources become available and the scheduling component disables the access control, it may reset the access probability for each agency to a predefined value, for example, one.

While the access control is on, after a predetermined period, for example after every 30 seconds, the scheduling component associated with each channel recalculates the access probability and percentage bandwidth being used by each agency. The recalculation may be based on the load on the channel for a predetermined period, for example the last 60 second. Depending on the determined bandwidth use, the scheduling component may set a negative acknowledgment flag to on and may use the access probability associated with each agency to send a negative acknowledgment to RA-Requests, from each agency that is using more than its allotted bandwidth, in order to control access to data channels. When the access control is turned off, the negative acknowledgment flag is also turned off and the scheduling component resets the access probability for each agency to a value, for example, one.

Figure 4:
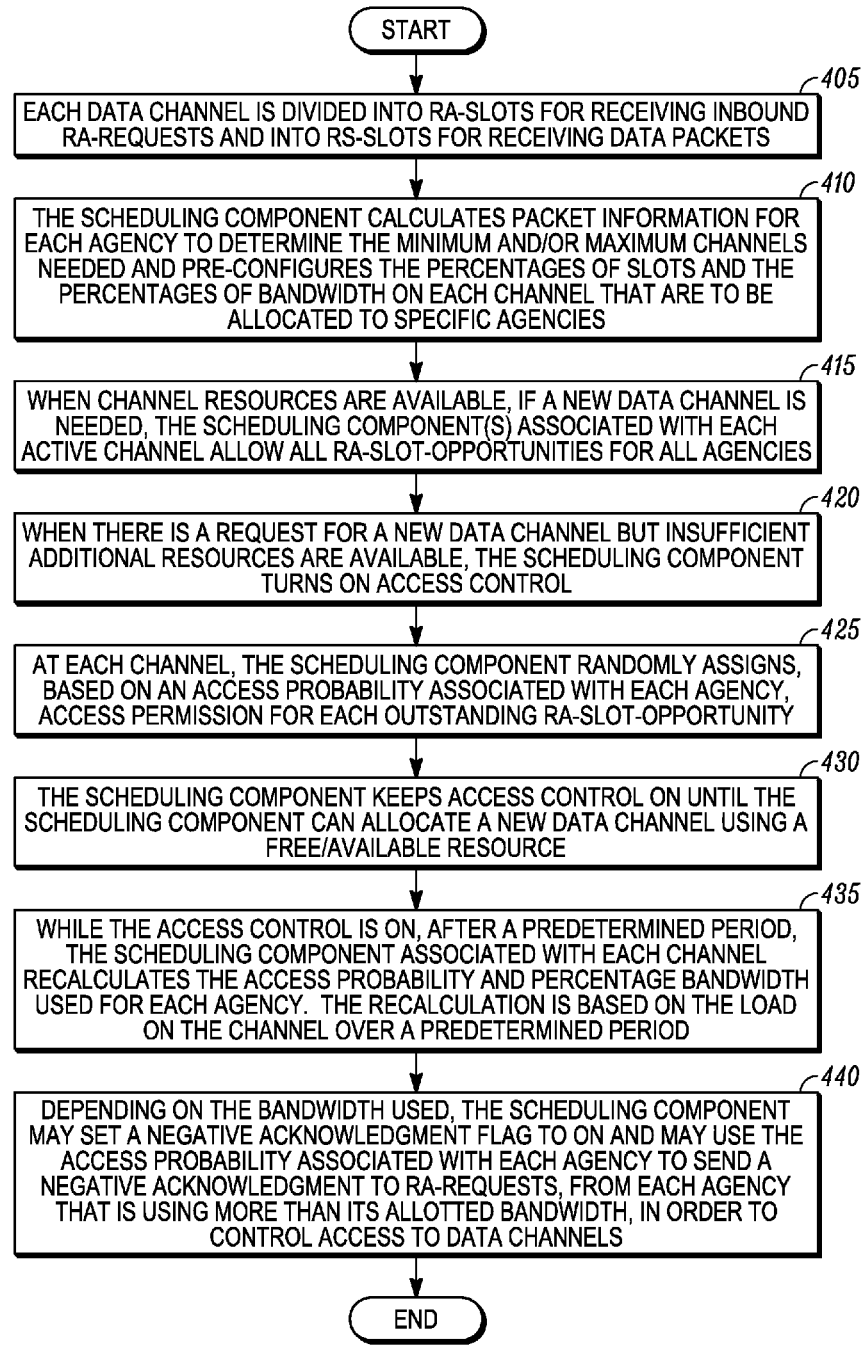
FIG. 4 is a flow diagram for granting agency access to a data channel in accordance with some embodiments.

FIG. 4 is a flow diagram for controlling agency access to data channels in accordance with some embodiments. In 405, each data channel is divided into RA-Slots for receiving inbound RA-Requests and RS-Slots for receiving data packets. In 410, the scheduling component calculates packet information for each agency to determine the minimum and/or maximum channels needed and pre-configures the percentages of slots and the percentages of bandwidth on each channel that are to be allocated to specific agencies. In 415, when channel resources are available, if a new data channel is needed, the scheduling component(s) associated with each active channel allow all RA-Slot-opportunities from all agencies. In 420, when there is a request for a new data channel but insufficient additional resources are available, the scheduling component turns on access control. In 425, at each channel, the scheduling component randomly assigns, based on an access probability associated with each agency, access permission for each outstanding RA-Slot-opportunity. In 430, the scheduling component keeps access control on until the scheduling component can allocate a new data channel using a free/available resource. In 435, while the access control is on, after a predetermined period, the scheduling component associated with each channel recalculates the access probability and percentage bandwidth used for all agencies. The recalculation is based on the load on the channel over a predetermined period. In 440, depending on the bandwidth used, the scheduling component may set a negative acknowledgment flag to on and may use the access probability associated with each agency to send a negative acknowledgment to RA-Requests, from each agency that is using more than its allotted bandwidth, in order to control access to data channels.

In some embodiments, in a system where multiple agencies share a data channel, agencies are guaranteed a minimum bandwidth for each agency's use. The minimum bandwidth may be claimed by the agency when one or more stations in the agency enters the system For a predetermined period, a first agency's unused minimum bandwidth may be used by another agency that has exceeded its own minimum bandwidth until the first agency needs the unused bandwidth. The allocation of the first agency's bandwidth to the second agency is done for a limited period of time to minimize the probability that the first agency will not receive its minimum allocation when the first agency needs it.

Accordingly, in some embodiments, actual bandwidth reservation per agency changes from time to time and from site to site based on available bandwidth and each agency's random access and reserved access utilization. Bandwidth reservation may change due to configuration, available bandwidth and actual load at different locations. Bandwidth reservation may also change due to available bandwidth and actual load as time goes by at a particular site. Bandwidth restriction is turned on when traffic requests exceed the available bandwidth. If the bandwidth restriction is not turned on, all bandwidth is shared and made available on an on-demand basis without regard to initial guaranteed bandwidth allocations on an agency by agency basis. After the bandwidth restriction is turn on, all agencies are initially allocated at least their pre-configured reserved bandwidth, but if an agency is determined to not be using all its allocated reserved bandwidth as determined over a predetermined period of time by the scheduling component, all or portions of the allocated reserved bandwidth can still be made available for other agencies on an as-needed and as-available basis.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, the scheduling component may comprise a set of instructions (perhaps stored in a volatile or non-volatile computer readable medium) that, when executed by a processor, perform some or all of the steps set forth in FIG. 4 and corresponding text. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing agency bandwidth guarantees and protections between communication devices associated with agencies sharing an agency-shared data channel that is divided into reserved access slots and into random access slots for requesting assignment of one or more of the reserved access slots, the method comprising:

configuring, at a scheduling component, initial reserved bandwidth allocations for communication devices associated with each agency permitted access to reserved access slots on the agency-shared data channel, the initial reserved bandwidth allocations providing guaranteed and protected agency bandwidth to communication devices associated with one or more agencies sharing the agency-shared data channel on an agency by agency basis in accordance with the initial reserved bandwidth allocations;

when sufficient bandwidth, including the initial reserved bandwidth allocations, is available on the agency-shared data channel to meet all bandwidth requests from all communication devices associated with all agencies requesting reserved access slot allocations on the agency-shared data channel, allowing, by the scheduling component, communication devices access to any available random access slot on the agency-shared data channel, wherein upon accessing a scheduled random access slot a communication device associated with an agency is able to reserve reserved access slots on the agency-shared data channel for data transmission regardless of the guaranteed and protected agency bandwidth granted by the initial reserved bandwidth allocations; and when one or more requests for additional reserved access slots on the agency-shared data channel from one or more communication devices associated with one or more of the agencies cannot be fulfilled due to insufficient available reserved access slots on the agency-shared data channel, responsively:

enabling, at the scheduling component, bandwidth management controls by controlling access to the agency-shared data channel by distributing, at the scheduling component, limited access permissions for future available random access slots to communication devices associated with agencies according to the initial reserved bandwidth allocations so as to enforce the guaranteed and protected agency bandwidth granted by the initial reserved bandwidth allocations; and a predetermined period of time after enabling bandwidth management controls, subsequently distributing updated limited access permissions for future random access slots according to a determined agency usage on the agency-shared data channel over the predetermined prior period of time such that random access slots reserved in accordance with the initial reserved bandwidth allocations for agencies determined to not be using their initial reserved bandwidth allocations over the predetermined period of time are subsequently temporarily re-assigned to other agencies.

2. The method of claim 1, wherein in response to the scheduling, the method further comprises receiving, by the scheduling component, a random access request from a particular agency in the scheduled random access slot, wherein the random access request specifies a number of additional reserved access slots the particular agency needs to transmit a data packet.

3. The method of claim 2, further comprising transmitting an acknowledgment acknowledging, by the scheduling component, a successfully received random access request, wherein the particular agency transmits the data packets in the additional reserved access slots upon receiving the acknowledgment.

4. The method of claim 3, evaluating, by the scheduling component, a reserved access slot transmission and allocating at least one additional reserved access slot to the particular agency when the reserved access slot transmission is determined to be unsuccessful.

5. The method of claim 1, wherein the distributing updated limited access permissions for future random access slots according to a determined agency usage comprises periodically checking random access slot utilization and responsive to determining that a first agency permitted access to the agency-shared data channel is not accessing random access slots initially allocated to the first agency, allowing a second agency sharing access to the agency-shared data channel with the first agency to access the random access slots initially allocated for the first agency.

6. The method of claim 5, wherein the distributing updated limited access permissions for future random access slots according to a determined agency usage comprises responsive to determining that the second agency needs to access more random access slots than are currently allocated to the second agency, allocating additional access permissions for the random access slots to the second agency according to at least one of the initial reserved bandwidth allocations for the second agency or the determined usage on the agency-shared data channel over a predetermined prior period of time.

7. The method of claim 1, wherein controlling access to the agency-shared data channel further comprises checking reserved access slot utilization and sending a negative acknowledgment to a particular agency permitted access to the agency-shared data channel if the particular agency reserved access slot utilization exceeds the initial reserved bandwidth allocation for the particular agency.

8. The method of claim 1, wherein the limited access permissions are signaled in periodically transmitted random access scheduling information.

9. The method of claim 1, further comprising disabling, at the scheduling component, the bandwidth management controls when further resources on the agency-shared data channel become available and all existing requests for access to random access slots can be fulfilled with the further resources.

10. An apparatus for providing agency bandwidth guarantees and protections between communication devices associated with agencies sharing an agency-shared data channel that is divided into reserved access slots and into random access slots for requesting assignment of one or more of the reserved access slots, the apparatus comprising a processor configured to:

assign initial reserved bandwidth allocations for communication devices associated with each agency permitted access to reserved access slots on the agency-shared data channel, the initial reserved bandwidth allocations providing guaranteed and protected agency bandwidth to communication devices associated with one or more agencies sharing the agency-shared data channel on an agency by agency basis in accordance with the initial reserved bandwidth allocations;

allow access to any random access slots on the agency-shared data channel when sufficient bandwidth, including the initial reserved bandwidth allocations, is available on the agency-shared data channel to meet all bandwidth requests from all communication devices associated with all agencies requesting reserved access slot allocations on the agency-shared data channel, wherein upon accessing a scheduled random access slot a communication device associated with an agency is able to reserve reserved access slots on the agency-shared data channel for data transmission regardless of the guaranteed and protected agency bandwidth granted by the initial reserved bandwidth allocations; and when one or more requests for additional reserved access slots on the agency-shared data channel from one or more communication devices associated with one or more of the agencies cannot be fulfilled due to a lack of sufficient available reserved access slots on the agency-shared data channel, responsively:

enable bandwidth management controls by controlling access to the agency-shared data channel by distributing limited access permissions for future random access slots to communication device associated with agencies according to the initial reserved bandwidth allocations so as to enforce the guaranteed and protected agency bandwidth granted by the initial reserved bandwidth allocations; and a predetermined period of time after enabling bandwidth management controls, subsequently distribute updated limited access permissions for future random access slots according to a determined agency usage on the agency-shared data channel over the predetermined prior period of time such that random access slots reserved in accordance with the initial reserved bandwidth allocations for agencies determined to not be using their initial reserved bandwidth allocations over the predetermined period of time are subsequently temporarily re-assigned to other agencies.

11. The apparatus of claim 10, wherein in response to the scheduling access to random access slots on the agency-shared data channel the processor is further configured to receive a random access request from a particular agency in the scheduled random access slot, wherein the random access request specifies a number of additional reserved access slots the particular agency needs to transmit a data packet.

12. The apparatus of claim 11, wherein the processor is further configured to:

transmit an acknowledgement acknowledging a successfully received random access request, wherein the particular agency transmits the data packets in the additional reserved access slots upon receiving an acknowledgment; and evaluate a reserved access slot transmission and allocate at least one additional reserved access slot to the particular agency when the reserved access slot transmission is determined to be unsuccessful.

13. The apparatus of claim 10, wherein the processor is further configured to periodically check random access slot utilization and responsive to determining that a first agency permitted access to the agency-shared data channel is not accessing random access slots initially allocated to the first agency, allow a second agency sharing access to the agency-shared data channel with the first agency to access the random access slots initially allocated for the first agency; and wherein responsive to determining that the second agency needs to access more random access slots than are currently allocated to the second agency, allocate additional access permissions for the random access slots to the second agency according to at least one of the configured initial reserved bandwidth allocations for the second agency or the determined usage on the agency-shared data channel over a second predetermined prior period of time.

14. The apparatus of claim 10, wherein in enabling a particular agency to reserve the additional reserved access slots the processor is further configured to periodically check usage by the particular agency of both the random access slots and the additional reserved access slots and distribute limited access permissions for future random access slots if the particular agency is using more random access slot than initially allocated to the particular agency and if the particular agency is using fewer additional reserved access slots than initially allocated to the particular agency.

15. The apparatus of claim 10, wherein the processor is further configured to check reserved access slot utilization and send a negative acknowledgment to a particular agency permitted access to the agency-shared data channel if the particular agency reserved access slot utilization exceeds the initial reserved bandwidth allocation for the particular agency.

16. The apparatus of claim 10, wherein the processor is further configured to randomly grant permissions for the future random access slots to agencies permitted access to the agency-shared data channel according to an access probability associated with each agency.

17. The apparatus of claim 10, wherein the processor is further configured to disable the bandwidth management controls when further resources on the agency-shared data channel become available and all existing requests for access to random access slots can be fulfilled with the further resources.

* * * * *